Fig-1-

United States Patent Office 3,178,767
Patented Apr. 20, 1965

3,178,767
METHOD OF RECOVERING MEAT FROM BONES
Thomas K. Shanks, Chicago, and George R. Carson, Midlothian, Ill., assignors to Swift & Company, Chicago, Ill., a corporation of Illinois
Filed Dec. 6, 1962, Ser. No. 242,810
3 Claims. (Cl. 17—45)

The present invention relates to a method for the recovery of meat from bones and more specifically to an improved method for automatically and mechanically removing residual meat after an initial boning operation has been performed.

It has long been recognized in the meat packing industry that large quantities of meat remain on bones after the primary cuts of meat have been removed from the carcasses. It has been the general practice in the past to attempt to recover this meat by manually scraping the bones; however, the expense and time involved in this operation has encouraged other methods of recovering the residual meat. Various chemical methods have been devised. However, these methods have generally altered the characteristics of the raw meat and have thus only been satisfactory for certain types of products and are limited in use. Various mechanical methods have also been tried principally involving cooked scraps whereby the meat is loose from the bone.

Recently, an automatic machine has been developed for conveying a plurality of uncooked bones, having quantities of residual meat adhering thereto, along a given path and operating upon the bones at a number of zones or stations to loosen and strip said meat therefrom. The means for loosening and stripping the meat have consisted of a series of knives and brushes mounted at varying angles and distances from the conveying means. The brushes have consisted of radially mounted nylon filament or fabric bristles. However, it has been found that such brushes are subject to substantial mechanical failure of the bristles and breakage of the bond between the brushes and the core. Thus, pieces of bristle and whole tufts of bristles are frequently mixed with the recovered meat. Also, brushing tends to recover meat in relatively small particles which imposes additional limitations on further handling and ultimate use. Further, it has been found that while an appreciable quantity of meat is recovered by brushing, a noticeable quantity of meat remains adhered to the bones throughout processing in prior machines and generally requires additional work for recovery.

It is therefore the primary object of this invention to provide an improved method for recovering meat from bones.

It is another object of this invention to provide an improved method for removing uncooked residual meat from bones.

It is a further object of this invention to provide an improved method for removing and recovering a higher percentage of residual meat from bones wherein the meat is recovered in larger particles.

Briefly, our invention resides in the finding that flailing of the bones by flexible metal flails having a flight-like configuration has made it possible to recover substantially greater quantities of residual meat from bones, while keeping breakage and deterioration of the apparatus to a minimum, and meat is recovered in larger particles. This procedure is particularly advantageous where recovering raw meat from uncooked bones. This has substantially done away with the problem caused by the breakage of brushes and the breakage of the bond between the brushes and the core which caused tufts and parts of bristles to be deposited in the product. By the use of suitably placed magnets, any parts of the metal flails that may break off may be removed and the effort required to protect against contamination of the recovered meat has been sharply reduced if not eliminated.

Two preferred types of metal flails have resulted in more complete removal of the meat from the bones and generally yield meat particles larger than those yielded with the brushes, namely sash-type chains, and coil springs. By sash-type chain we mean to include not only sash chains themselves, but also other similar chains which provide a relatively rough surface resulting in a spaced flight-like configuration for digging into the meat attached to the bone. Coil springs also exhibit a similar flighted profile. Each of these flails are flexible in all directions so that raking and digging action is obtained from the sides of each flight of the flails as well as the ends. These flexible flails tend to wrap around and into irregularities in the bone structure giving more over-all coverage than was heretofore possible. In addition, flexibility also gives the flails a self-cleaning action. Thus, it may be seen that the use of metal coil springs or sash-type chains as flails has shown a very definite benefit in the quality and quantity of the meat removed. It is also contemplated that adhered residual meat (particularly uncooked meat) may first be loosened somewhat by making a plurality of cuts therein, substantially normal to the bone, before flailing.

With respect to quality, the use of ferrous metals permits ready and complete removal by magnetic attraction of any broken pieces of the flails from the product, which is not possible with synthetic or natural fiber bristles. With respect to quantity, the use of metal flails produces approximately twice as much useable product as the previously used nylon filament or fiber bristles yielded under similar operating conditions. This has resulted in an increased yield per bone and in some cases has allowed the number of scraping units to be reduced.

Other objects and advantages of our invention will become apparent from the following detailed description and drawings in which.

Figure 1:
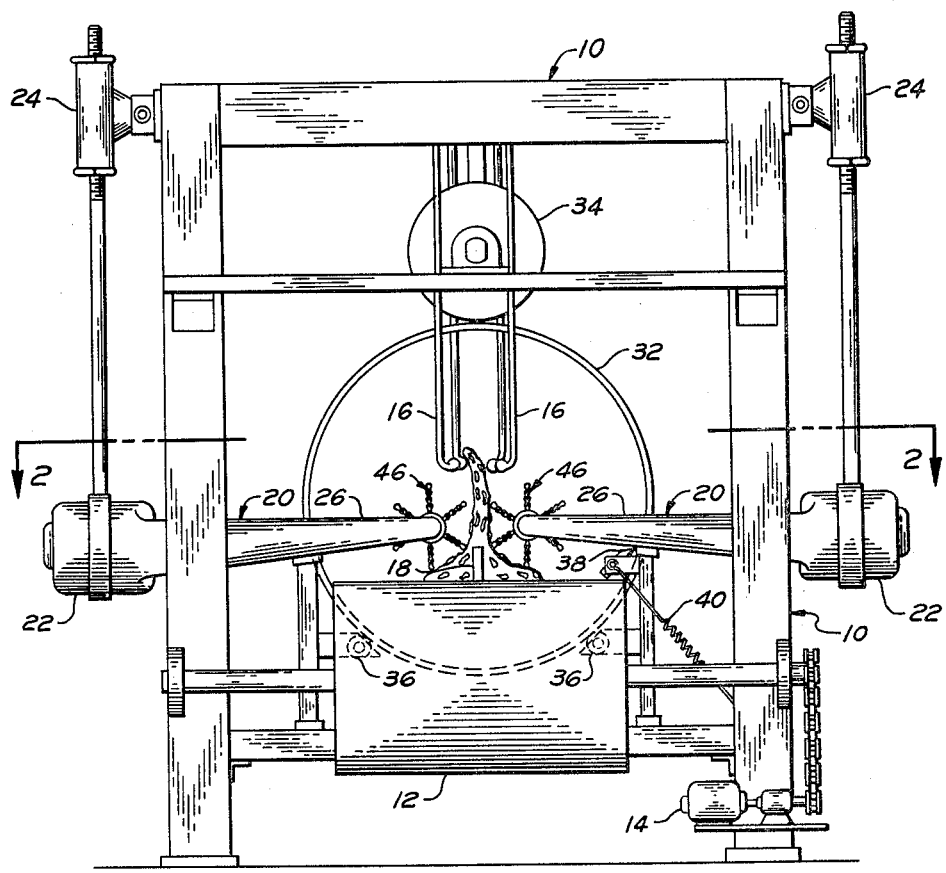
FIGURE 1 is an end view of a device for recovering meat from bones utilizing the present invention.
Figure 2:
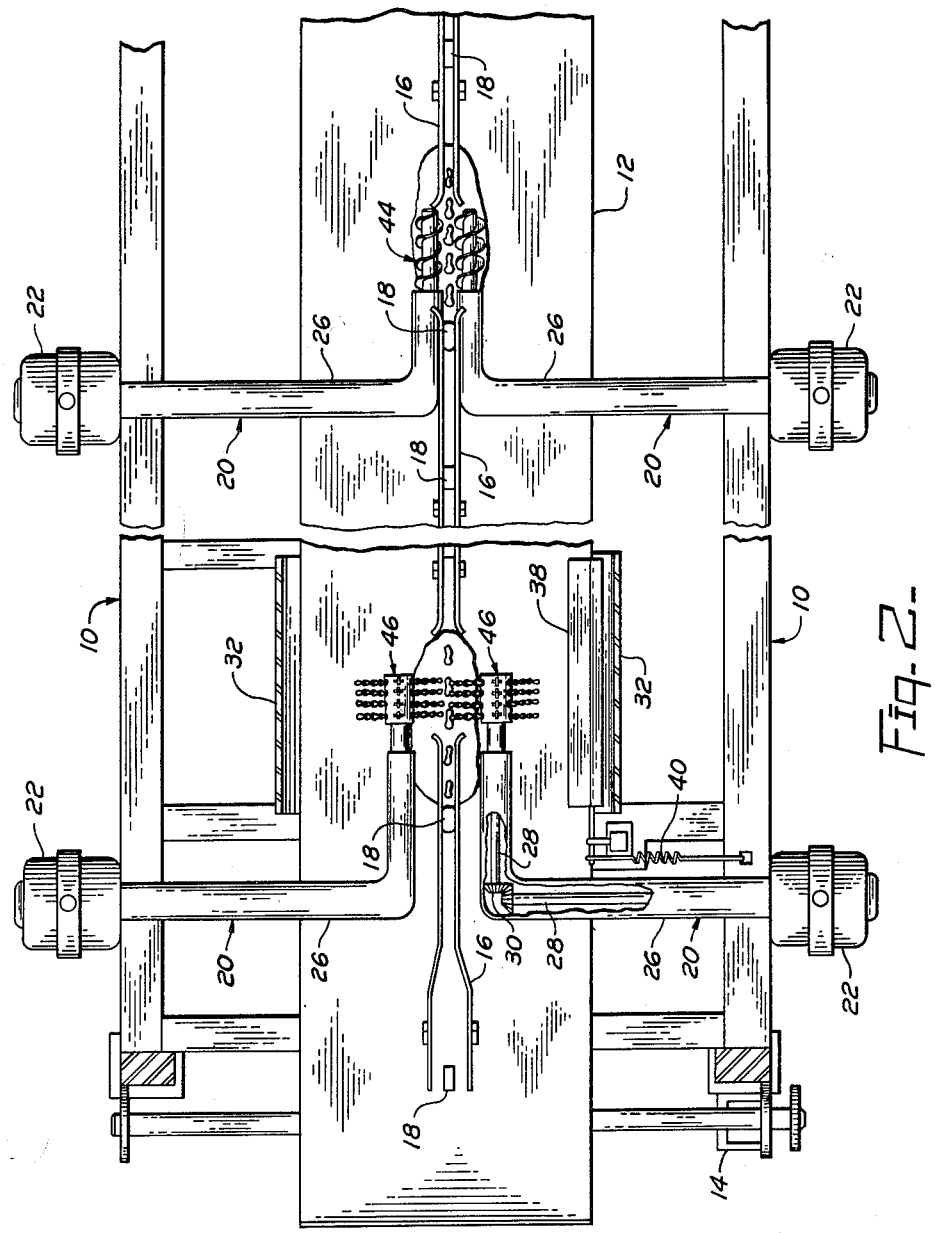
FIGURE 2 is a sectional plan view of the device of FIGURE 1 taken along line 2—2 in FIGURE 1.

Referring to FIGURES 1 and 2, a device for performing the present invention is shown. This device is adapted to cut and flail meat adhered to bones and to collect the particles of meat torn from the bone by the step of flailing. The preferred form of flailing means is shown installed on the device.

As is illustrated the device is comprised of a frame generally 10 having a continuous belt-type conveyor 12 driven by a motor 14. Above the upper run of the conveyor 12 are located a series of guides 16 for directing the bones to the proper position at operating stations located along the conveyor. The conveyor 12 is provided with a series of bone pushing lugs 18, located at intervals along the length of the conveyor 12, for urging the loin bones along the path of the conveyor to the operating stations.

Spaced in opposing pairs along the upper flight of the conveyor are a series of operating elements shown generally as 20. Each of the operating elements 20 is comprised of a driving means 22 pivotally connected to the upper portion of frame 10 by a pivot mount assembly 24. A right angle tubular member 26 is connected to each driving means and houses a pair of power transmitting shafts 28 connected at right angles by bevel gears 30. The power transmitting shafts 28 are connected to the driving element of the drive means 22 at one end, and are adapted for the mounting of tool means such as helical knives generally 44, for first loosening the adhered meat by cutting toward the bone, and flail means generally 46, for tearing the meat from the bone.

Viewing the over-all device in FIGURE 2, it may be seen that there are several pairs of operating elements located along the path of the conveyor. The figure has been broken in two places for ease of understanding; however, it should be understood that in the normal operation there are generally four to six pairs of operating elements located along the path of the conveyor. Groups of the operating elements which are adapted to scrape the meat from the bones are surrounded by a collector drum 32 (best seen in FIGURE 1), rotated by a power means generally 34 and supported on rollers 36 or the like. A doctor blade 38 is pivotally mounted inside of the rotatable collector drum and is urged against the side thereof by a bias means such as spring 40.

In operation it may be seen that the loin bones are placed on the conveyor adjacent a bone pushing lug 18 and are carried through guide means 16 past the various operating elements 20 which perform either cutting or scraping functions. At the scraping elements, the meat is thrown against the side of revolving collector drum 32 and is removed therefrom by the doctor blade 38 and deposited on conveyor belt 12.

The instant invention resides principally in the rotatable flail means 46 mounted on the ends of some of the power transmission shafts 28. Such flail means may be characterized by the fact that they have radially extending flails each having a flight-like configuration throughout its length providing transverse shoulders or ridges that are raked across a bone to strip and tear residual meat therefrom. Two types of preferred flail means have been devised which give vastly superior results when compared with the nylon filament and fabric bristles previously used. The improved elements comprise flexible metallic scraper flails extending radially from cylindrical core members. One preferred form of the metallic scraper elements is a sash-type chain (illustrated in FIGURES 1 and 2) shown in detail in FIGURES 3 and 4. A second preferred form is a coil spring shown in FIGURES 5 and 6. Either form of flail should extend about 1⅜ inches to 2⅝ inches radially from the core. Core sizes range from 2 to 3 inch diameter and ¾ to 4 inches in length. Normally the flails are spaced about ⅝ inch between centers in four equally spaced longitudinal rows. The size of core and number and length of flails is determined by the type and portion of bone to be scraped.

Figure 3:
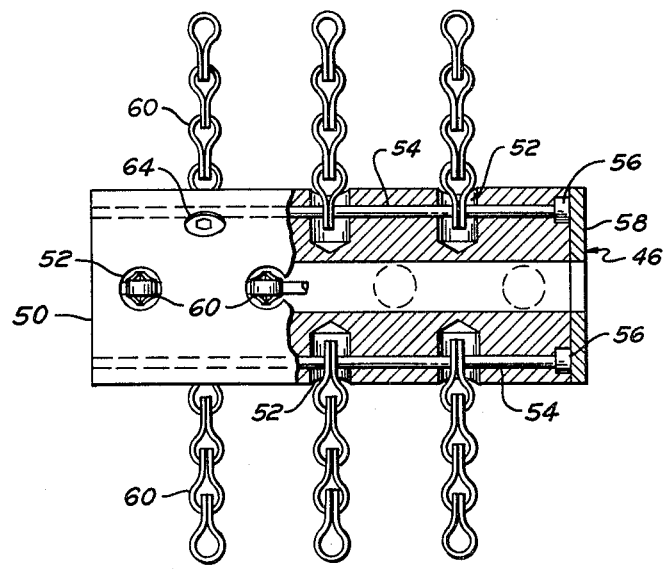
FIGURE 3 is a side view partially in section of a chain-type flail used in the present invention.
Figure 4:
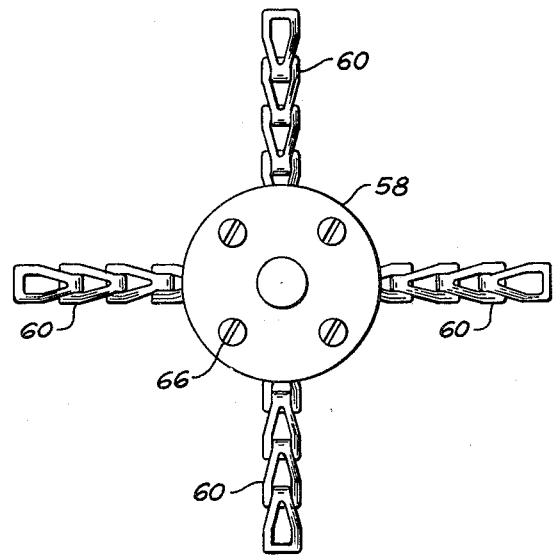
FIGURE 4 is an end view of the flail shown in FIGURE 3.

Referring first to the sash-type chain flail means generally 46, it may be seen in FIGURES 3 and 4 that this element includes a cylindrical core 50 with a plurality of rows of radially drilled holes 52 equally spaced about its circumference. The walls of each of the holes have been pierced to allow the insertion through all of the holes in a given row of a rod 54 having a head 56 countersunk in the end of the core and held in place by end plate 58, which, in turn, is held on by four countersunk screws 66. In each of the holes, mounted on the respective rods, is a sash chain flail 60 having a plurality of links. The entire flail means 46 is secured to the power transmitting shaft by means of two set screws 64 in the body of the core. It will be appreciated that the number of links will vary with the size of the links and the type of bone which is to be scraped. Chain of No. 30–50 size is most suitable; and for scraping beef loin bones flail elements constituting 4–5 links are sufficient with 4 links of No. 50 chain preferred. Chain flails may range between 1⅝ inches and 2⅝ inches measured from the core surface.

Figure 5:
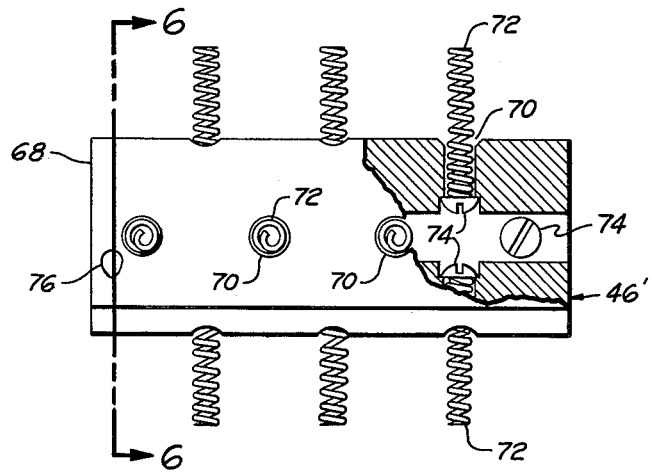
FIGURE 5 is a side view partially in section of a spring-type flail used in the present invention.
Figure 6:
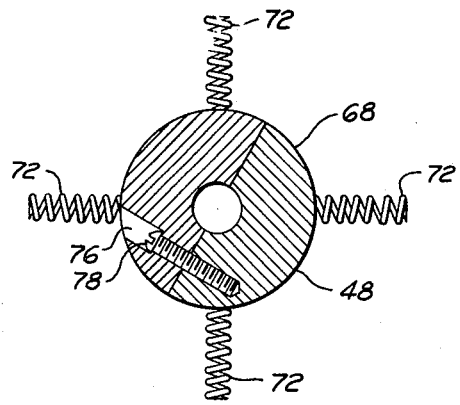
FIGURE 6 is a sectional view of the flail taken at line 6—6 in FIGURE 5.

Referring now to FIGURES 5 and 6, there is illustrated a coil spring flail means generally 46'. As may be seen, this element includes a hollow split core 68 consisting of two halves, each half having a plurality of rows of radially drilled holes 70 therein. These holes extend through the entire outer surface of the core into its hollow interior. Snug fitting spring coil flails 72 are inserted in each of the holes and a sheet metal screw 74 is screwed into the coil 72 from the inside of the core 68, forcing the coil 72 to expand into the core and form a firm bond. The halves of the split core 68 are secured together and upon a shaft 28 by a pair of screws 78 extending through threaded holes 76 in each half. Preferred coils 72 for stripping meat from beef loin bones are formed from No. 20 spring steel wire and have 7/32 inch O.D. with about thirteen turns per inch length. Lengths of coils range from 1⅜ inches to 2 inches measured from the core surface.

As may be seen, both preferred forms of flail means generally 46, 46' have flail elements that are flexible in all directions so that a raking action is obtained from the sides of the springs and chains as well as the ends. These flexible flails, though normally straight due to centrifugal force, will tend to wrap around and into irregularities in the bone structure. Either the coil spring or the sash chain flail may be used to equal advantage where a smooth bone is being scraped. However, for applications where jagged bones are being scraped, the chain flail has been found superior since the coil springs tend to attach on broken or jagged edges of bones and will stretch the length of the wire and become entangled with the other flails. Accordingly, the chain type flail means 46 is the more preferred of the two described forms.

The use of the spring and chain flails has resulted in a significant increase in the amount of usable meat recovered per bone. In general terms, the chain and spring flails enable recovery of about twice as much useful product as was heretofore possible. An example of this improvement may be seen from the following table comparing average recovery of usable meat from two beef loin bones by the above-described apparatus when using brushes, chain flail elements and coil spring flail elements, respectively. Each test was conducted under substantially identical conditions upon two loin bones weighing approximately 4½ pounds and of comparable trim.

*Average recovered usable meat*

| Brushes, lbs. | Chain-Type Flails, lbs. | Spring Coil-Type Flails, lbs. |
| --- | --- | --- |
| .75 | 1.8 | 1.8 |

In addition to the above-noted advantages, the coil spring flails and sash chain flails resulted in noticeably larger meat particle sizes. This result is illustrated in the following table:

*Average particle size of meat recovered*

| Brushes | Sash Chain Flails | Spring Coil Flails |
| --- | --- | --- |
| ⅛ inch dia. and smaller | 3/16–⅜ inch dia. | 3/16–⅜ inch dia. |

It should be noted that while the instant invention has been described in conjunction with a specific machine designed for stripping meat from loin bones, that the invention could be used in many and varying types of machines for stripping meat from bones. Similarly, the size and shape of the core members may be changed and various methods for attaching flails to such cores may be utilized. Other modifications and variations of the instant invention will also become readily apparent to those skilled in the art and therefore only such limitations should be placed on the invention as appear in the appended claims.

We claim:
1. An improved method for recovering residual meat from bones comprising: loosening the residual meat by cutting; and flailing areas of said bone to which meat is adhered with flexible flail elements having a flighted configuration, said flail elements tearing meat particles from said bone and throwing said particles onto a collecting means.
2. An improved method for recovering raw residual meat from bones comprising: loosening the residual meat by making a plurality of cuts therein; flailing areas of said bone to which meat is adhered with flail elements consisting of lengths of sash-type chain; and collecting particles of meat that are torn from said bone by the raking action of said flail elements.
3. An improved method for recovering raw residual meat from bones comprising: loosening the residual meat by making a plurality of cuts therein substantially normal to the bone; raking areas of said bone to which meat is adhered with flail elements consisting of lengths of coil springs; and collecting particles of meat that are torn from said bone by the raking action of said flail elements.

References Cited by the Examiner

UNITED STATES PATENTS

| | | | |
|---|---|---|---|
| 481,841 | 8/92 | Bourgin | 56—29 |
| 1,694,018 | 12/28 | Mudge et al. | 17—5 |
| 1,741,332 | 12/29 | Pearl | 17—1 |
| 2,341,486 | 2/44 | Swertfeger | 56—29 |
| 2,932,060 | 4/60 | Massengill | 17—45 |
| 3,089,775 | 5/63 | Lindall | 99—107 |
| 3,090,989 | 5/63 | Stahl | 17—1 |

FOREIGN PATENTS

| | | |
|---|---|---|
| 220,077 | 3/10 | Germany. |
| 20,238 | 1901 | Great Britain. |

SAMUEL KOREN, *Primary Examiner.*

LUCIE H. LAUDENSLAGER, *Examiner.*